United States Patent [19]

Simon

[11] 4,348,620
[45] Sep. 7, 1982

[54] MAGNETIC FIELD PRESETTING CIRCUIT FOR AN EXCITER FIELD WINDING IN AN ELECTRICAL PROPULSION SYSTEM FOR TRACTION VEHICLES

[75] Inventor: Martin Simon, Erie, Pa.
[73] Assignee: General Electric Company, Erie, Pa.
[21] Appl. No.: 187,126
[22] Filed: Sep. 15, 1980
[51] Int. Cl.³ .......................................... H02K 23/00
[52] U.S. Cl. ................................. 318/154; 318/151
[58] Field of Search ........................... 318/140–158, 318/375

[56] References Cited
U.S. PATENT DOCUMENTS

| | | | |
|---|---|---|---|
| 3,492,556 | 1/1970 | Friend | 318/157 |
| 3,684,937 | 8/1972 | Reeves et al. | 318/261 |
| 3,798,520 | 3/1974 | Friend et al. | 318/158 |
| 3,974,429 | 8/1976 | Friend et al. | 318/350 |
| 4,188,569 | 2/1980 | Campbell | 318/375 |

Primary Examiner—J. V. Truhe
Assistant Examiner—S. M. Bergmann
Attorney, Agent, or Firm—Albert S. Richardson, Jr.

[57] ABSTRACT

A traction vehicle propulsion system comprises a d-c motor and an excitation generator for separately exciting the motor field. Current in the field winding of the excitation generator is normally controlled by a control circuit which is arranged to prevent vehicle misdirection due to control circuit failure modes wherein normal excitation current is not supplied. The control circuit comprises means responsive to an acceleration command signal for temporarily removing the field winding from the normal control circuit and for placing it instead in a biasing circuit comprising low impedance paths to the respective terminals of a direct voltage source, thereby presetting the magnetic field of the field winding in the proper direction to prevent vehicle misdirection upon acceleration from rest.

8 Claims, 3 Drawing Figures

MAGNETIC FIELD PRESETTING CIRCUIT FOR AN EXCITER FIELD WINDING IN AN ELECTRICAL PROPULSION SYSTEM FOR TRACTION VEHICLES

SUMMARY OF THE INVENTION

The present invention relates generally to electric propulsion systems for traction vehicles, and more particularly to an improved control circuit for avoiding misdirection of a traction vehicle when it is accelerated from rest.

An electrical propulsion system for a traction vehicle, such as a large haulage truck, typically uses a prime mover to drive electric generating means for supplying electric power to the armatures of traction motors. The electric generating means typically is a direct current (d-c) generator, and the traction motors typically are d-c motors having separately excited shunt field windings. A second electric generating means (hereinafter referred to as an excitation generator, or simply an exciter), usually in the form of an electrodynamic machine that is also driven by the prime mover, is provided to supply excitation for the field windings of the d-c motors. To vary or control the level of excitation, a controllable switch is connected in circuit with a field winding of the exciter.

A prior art control circuit for controlling excitation current in an exciter field winding includes means for periodically turning on and off the controllable switch in a well known "pulse width modulation" mode. When the switch is on a direct voltage is applied across the field winding which then conducts magnetizing or excitation current in a given direction. If the switch or its controls were to fail so that there is no excitation current, the output voltage of the exciter would depend on the residual magnetic field, if any, in the magnetizable core of the field winding. Initially, with the vehicle stopped, the polarity of such residual magnetic flux is uncertain or unpredictable, being dependent on the most recent operating history of the vehicle, Thus if a malfunctioning exciter field switch does not turn on when the operator attempts to accelerate the vehicle from rest in one direction, there is a risk that the vehicle might actually move in the opposite direction.

Accordingly, it is a general objective of the present invention to provide an improved control circuit for an excitation generator field winding used in a traction vehicle electrical propulsion system, which circuit is effective to prevent misdirection of a traction vehicle when the vehicle is accelerated from rest.

In carrying out this invention in one form, an improved control circuit is provided for a traction vehicle propulsion system using separately excited d-c traction motors. A prime mover drives both a main d-c generator which supplies electric power to the armatures of the traction motors and a rotating exciter which is connected to the motor field windings for supplying excitation current thereto. The field winding of the exciter is in turn supplied with excitation current by a control circuit including means for effectively connecting one end of this winding to a first terminal of a d-c power source. The other end of the exciter field winding is connected to a second terminal of the d-c source through switching means having alternate conducting and non-conducting states. The switching means is periodically switched between these two states by an associated pulse width modulator which controls the timing of state changes in a manner to attain a desired excitation current in the exciter field winding.

Means responsive to an acceleration command signal is provided to disconnect temporarily the exciter field winding from the switching means and to connect it in a low impedance biasing circuit that directly spans the first and second terminals of the d-c source. Current in this biasing circuit will preset the magnetic field of the exciter field winding in the correct direction to ensure that the traction vehicle accelerates in the desired direction. Preferably means is provided for disabling the main d-c generator so that it does not supply power to the traction motors until the magnetic field presetting current is sensed in the exciter field winding biasing circuit.

The invention will be better understood and its various objects and advantages will be more fully appreciated from the following description taken in conjunction with the accompanying drawing.

DETAILED DESCRIPTION

Figure 1:
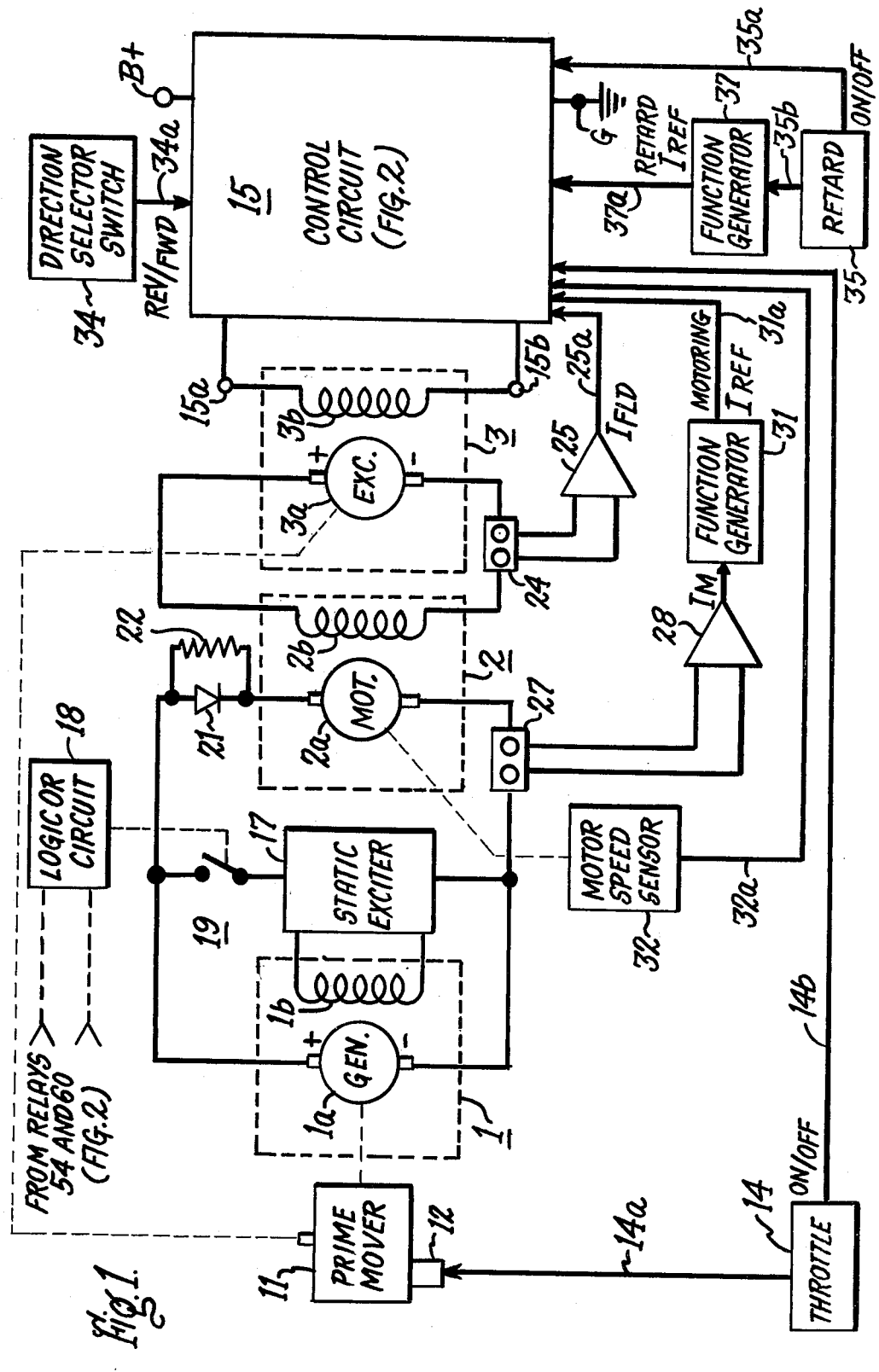
FIG. 1 is a circuit diagram partially in block form showing the elements of a traction vehicle propulsion system utilizing the present invention.

The propulsion system shown in FIG. 1 is intended to be physically located on a self-propelled traction vehicle such as a large off-highway truck. It includes at least one separately excited d-c traction motor 2 having an armature 2a which is coupled through suitable speed-reduction gearing to a wheel (not shown) of the vehicle. Excitation current is supplied to a shunt field winding 2b of the motor by an excitation generator or rotating exciter 3 having an armature 3a and a field winding 3b. The exciter 3 is driven by a prime mover 11 (e.g., a diesel engine) at a speed determined by a governor 12 which is, in turn, responsive to a signal on a line 14a from a manually controlled throttle 14 (e.g., a foot pedal on the vehicle). Excitation current for the exciter field 3b is provided at output terminals 15a and 15b of a control circuit 15, to be hereinafter described in more detail.

The prime mover 11 also drives a self-excited main generator 1 having an armature 1a and a field winding 1b which is connected to a static exciter 17. Preferably the static exciter 17 is constructed and arranged in the manner disclosed in U.S. Pat. No. 4,103,211-Gardner et al. It is connected across the armature 1a of the generator by way of a switch or contactor 19 whose operating mechanism is controlled by an associated logic OR circuit 18. The generator 1 supplies d-c electric power to all of the vehicle's traction motors, and in FIG. 1 its output is shown connected to the motor armature 2a through a diode 21 in parallel with a "reverse current" resistor 22.

The control circuit 15 has a number of inputs which are shown functionally in FIG. 1. A first current sensor 24 is connected in series with the motor field 2b, and its output is amplified at 25 and fed via line 25a to the control circuit 15. A second current sensor 27 is connected in series with the motor armature 2a, with its output being amplified at 28 and fed to a function generator 31 which produces a motoring current reference signal on an input line 31a of the control circuit 15. A motor speed sensor or tachometer 32 monitors the speed of the motor 2 and provides a motor speed feedback signal on line 32a which also is connected to the control circuit 15. The throttle 14 provides an on/off signal on a line 14b to the control circuit 15. A direction selector switch 34 provides a digital reverse/forward signal on input line 34a of the circuit 15.

The control circuit 15 also receives signals from a manually operated retard controller 35 (e.g., another foot pedal) which provides an on/off signal directly to the control circuit 15 by way of line 35a and which further provides an analog signal on line 35b to a function generator 37. The function generator 37 produces a retard current reference signal which is applied to an input line 37a of the control circuit 15. Power to the control circuit is provided by means of a d-c electric power source, such as a 48-volt battery (not shown), having a first terminal B+ of relatively positive potential and a second, common terminal G at a different potential which can be equal to (as shown) or negative with respect to ground.

Figure 2:
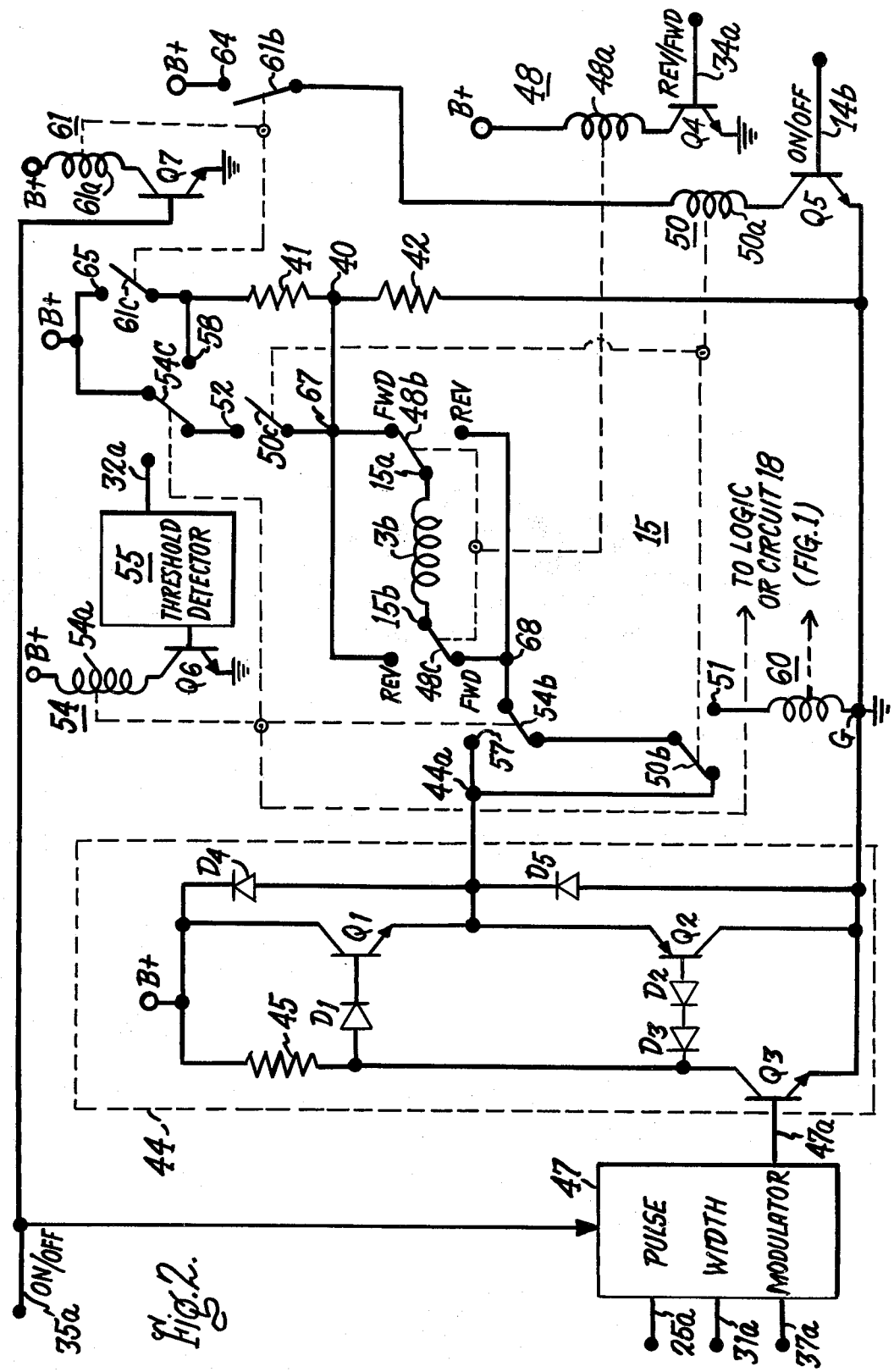
FIG. 2 is a circuit diagram partially in block form showing the details of one embodiment of an improved control circuit for an excitation generator field winding, in accordance with the present invention.

In FIG. 2 the excitation generator field winding 3b is again shown connected between the output terminals 15a and 15b of the control circuit 15. One end of this field is connected to a terminal 40 between a pair of resistors 41 and 42 which are connected in series with each other to form voltage-dividing impedance means between the voltage supply terminals B+ and G. The other end of the exciter field 3b is connected to an output terminal 44a of controllable switching means 44.

The switching means 44, hereinafter referred to as the field switch, includes a pair of power transistors Q1 and Q2 and an input transistor Q3. As is shown in FIG. 2, the transistors Q1 and Q2, which are NPN and PNP types, respectively, are connected in series between the voltage supply terminals B+ and G, and the juncture of their emitters is the output terminal 44a. The input transistors Q3 (NPN) has its emitter connected to the terminal G and its collector connected through a "pull-up" resistor 45 to the terminal B+. The collector of Q3 is also connected through a diode D1 to the base of Q1, and the base of Q2 is connected through serial diodes D2 and D3 to the collector of Q3. A free-wheeling diode D4 is connected in inverse-parallel relationship with the transistor Q1, and another diode D5 is connected in inverse-parallel relationship with Q2. A control signal for the field switch 44 is provided by a pulse width modulator (PWM) 47 on a line 47a. As will soon be explained in more detail, the transistor Q2 is intended to operate in a bistable switching mode, being in a low impedance, conducting ("on") state whenever the signal on line 47a is high ("1") and being in a high impedance, non-conducting ("off") state whenever there is no high signal on line 47a.

The PWM circuit 47 normally produces on the line 47a a train of discrete high output pulses having a constant frequency (e.g., 400 HZ) but variable durations or widths. The pulse width is modulated as a function of selected combinations of the signals on the lines 25a, 31a, and 37a, which signals are respectively representative of the actual motor field current, the motoring current reference, and the retard current reference. The duty cycle (i.e., ratio of individual pulse width to the period of repetition) of the pulses on line 47a is variable between 0 and 1.

The control circuit 15 shown in FIG. 2 also includes a direction selector relay 48, an acceleration relay 50, and a speed threshold relay 54. The direction selector relay 48 comprises an operating coil 48a and two double-throw movable contacts 48b and 48c which are respectively connected to the output terminals 15a and 15b. In their deenergized positions, these contacts complete a circuit that conducts current from a terminal 67 to a terminal 68 through the exciter field 3b in a "positive" direction (from right to left as viewed in FIG. 2), whereas in their energized positions the contacts 48b and 48c will complete a circuit that conducts current from 67 to 68 through the field 3b in the opposite or "negative" direction. The direction of current exciting the field 3b determines the polarity of the output voltage of the exciter 3, and this polarity in turn determines the direction of current in the motor field winding 2b and hence the rotational direction of the rotor of the traction motor 2. With positive current in the exciter field 3b, the exciter output voltage polarity is as shown in FIG. 1 and the motor turns in a predetermined forward direction, but negative field current will reverse the output voltage polarity and consequently the direction of motor rotation.

The operating coil 48a of the direction selector relay 48 is connected between terminal B+ and the collector of a transistor Q4 having an emitter connected to ground and a base connected to the line 34a which is provided with alternative low (forward) or high (reverse) input signals. When Q4 is turned on by a high signal on the line 34a, the coil 48a is energized and the movable contacts 48b and 48c switch from their respectively associated "FWD" terminals to the terminals designated "REV."

The acceleration relay 50 comprises an operating coil 50a and movable contacts 50b and 50c shown in their de-energized positions. When the relay 50 is energized, the contacts 50b and 50c engage terminals 51 and 52, respectively. The coil 50a is connected via a movable contact 61b between B+ and the collector of a transistor Q5, the emitter of which is connected to ground and the base of which is connected to the line 14b to which the throttle on/off signal is applied.

The speed threshold relay 54 comprises an operating coil 54a, a pair of movable contacts 54b and 54c, and a third movable contact (not shown) located in the logic OR circuit 18. When the relay 54 is energized, the movable contacts 54b and 54c engage terminals 57 and 58, respectively. The terminal 57 is connected directly to the output terminal 44a of the field switch 44, and the contact 54b is disposed to complete a connection between terminals 68 and 44a when the speed threshold relay 54 is energized. In its deenergized position, the contact 54b is connected in series with the contact 50b of the acceleration relay 50 to complete a connection between terminals 68 and 44a so long as the contact 50b is also in its deenergized position.

Contact 54c of the speed threshold relay 54 is connected in series with contact 50c of the acceleration relay 50 between the voltage supply terminal B+ and the terminal 67, whereby a relatively low impedance path is provided between these terminals whenever relay 54 is deenergized and relay 50 is energized. Upon energization of the speed threshold relay 54, the contact 54c moves into engagement with terminal 58, thereby open circuiting the aforesaid low impedance path and completing a connection between the resistor 41 and the terminal B+. The operating coil 54a of the relay 54 is connected between B+ and the collector of a transistor Q6 the emitter of which is connected to ground and the base of which is connected to the output of a motor speed threshold detector 55 receiving as an input the motor speed feedback signal on the line 32a.

The terminal 51 associated with the acceleration relay contact 50b is connected to the voltage supply terminal G via a circuit including a relatively low resistance operating coil 60a of a field bias detection relay 60. This coil operates a movable contact (not shown) located in the logic OR circuit 18 (FIG. 1).

As can be seen in FIG. 2, the control circuit 15 also includes a retard relay 61 comprising an operating coil 61a and movable contacts 61b and 61c, shown in their deenergized positions. When this relay is deenergized, its contact 61b engages a terminal 64 to complete the connection between the operating coil 50a of the acceleration relay 50 and B+. On the other hand, when the relay 61 is energized its contact 61c engages a terminal 65 to complete a connection between the resistor 41 and B+. The operating coil 61a of the retard relay is connected between B+ and the collector of a transistor Q7 the base of which is connected to the line 35a on which the retard on/off signal is supplied. In the motoring mode of operation, the signal on line 35a is low ("0") and the relay 61 is deenergized. In the electrical retard mode of operation, the retard signal is "on" and a high signal is impressed on the line 35a, thereby turning on Q7 and energizing the relay 61 which causes the contact 61b to open and the contact 61c to close. This prevents energization of the acceleration relay 50 and connects the resistor 41 to B+.

The operation of the control circuit 15 will now be described. It is appropriate first to consider the circuit while the traction vehicle is at rest. At rest the prime mover 11 (FIG. 1) is idling or shut down, and no current is supplied from the control circuit output terminals 15a and 15b to the exciter field 3b. However, the magnetic core (not shown) of the field winding 3b can retain a residual magnetic field of variable direction and intensity which depend on the history of the direction and magnitude of current supplied to the winding 3b just prior to the traction vehicle coming to a stop.

When it is desired to accelerate the traction vehicle in the forward direction, the operator places the direction selector switch 34 in its forward position and advances the throttle 14 which increases the speed of the prime mover and hence of the generator 1 and the exciter 3. A low (forward) signal on line 34a causes the transistor Q4 (FIG. 2) to be off, whereby the direction selector relay 48 is deenergized and its contacts 48b and 48c are in the positions shown in FIG. 2. This causes the current path through the exciter field winding 3b to include, in order, terminal 67, output terminal 15a, the winding 3b, output terminal 15b, and terminal 68. (Conversely, if a reverse direction were selected, a high signal on line 34a turns on the transistor Q4, thus energizing the relay 48 and causing the current path through the field winding 3b to include, in order, terminal 67, output terminal 15b, the winding 3b, output terminal 15b, and terminal 68.)

Upon advancing the throttle 14 from its zero speed position, a high ("1") signal is impressed on line 14b, thereby turning on the transistor Q5 which conducts current through the closed contact 61b of the deenergized retard relay 61 and through the acceleration relay operating coil 50a. This current, herein referred to as an acceleration command signal, energizes the acceleration relay 50 which now moves its contact 50c into engagement with terminal 52 to connect the terminal 67 to the positive voltage supply terminal B+ through the relatively low impedance path including the contact 54c of the deenergized speed threshold relay 54. This path bypasses the resistor 41 so that both terminals 40 and 67 are at substantially the same high potential as B+, thereby obtaining, in a known manner, a desirable initial boost in the magnitude of exciter field excitation. At the same time, in accordance with the present invention, the relay 50 moves its contact 50b into engagement with the terminal 51 to connect the terminal 68 to the ground terminal G through another relatively low impedance path including the contact 54b of the speed threshold relay and the operating coil 60a of the field bias detection relay 60, thereby shunting the transistor Q2 of the field switch 44 and assuring the completion of a low impedance bias circuit for the exciter field 3b. Current in this circuit presets the magnetic field in the core of the field winding 3b in the correct direction to ensure that the exciter output voltage will have the proper polarity to cause the traction motor 2 to rotate in the desired forward direction. If the residual magnetic flux in the exciter field were in the wrong direction, the field presetting current in the biasing circuit has sufficient magnitude to override or swamp out such residual, whereby a possible misdirection of the motor is avoided. The field presetting current also energizes the relay 60.

Prior to the energization of the bias detection relay 60, its movable contact in the logic OR circuit 18 is in a position to keep the generator exciter field switch 19 (FIG. 1) open and the static exciter 17 deenergized, thus disabling the main generator 1 from supplying power to the motor armature 2a. When, however, the relay 60 is energized, its contact changes positions and causes the logic OR circuit 18 to actuate the mechanism that closes the switch 19, thereby enabling the main generator 1 to generate and apply voltage to the motor. The magnitude of the generated voltage (and hence the speed of the motor 2) will increase with the speed of the prime mover 11, as will the magnitude of the output voltage of the rotating exciter 3.

As the motor attains a predetermined speed (e.g., equivalent to a vehicle speed of 3 MPH), the threshold detector 55 responds by applying a high ("1") signal to the base of the transistor Q6, thereby turning on the transistor Q6 and energizing the speed threshold relay 54. Consequently the relay 54 moves its contact 54c into engagement with terminal 58, thereby opening the initially effective field boost path and completing a connection between resistor 41 and terminal B+. The potential on the terminals 40 and 67 to which the control circuit output terminal 15a is connected is now somewhat lower (less positive) than the potential on the terminal B+, as determined by the relative resistances of the resistors 41 and 42. The ohmic value of resistor 42 (e.g., 7 ohms) is much higher than that of resistor 41 (e.g., 1 ohm).

When energized in response to Q6 being turned on, the speed threshold relay 54 is operative to move its contact 54b into engagement with terminal 57, thereby open circuiting the low impedance path between terminals 68 and G and reconnecting the terminal 68 to the field switch output terminal 44a. Another contact of the relay 54 is effective in the logic OR circuit 18 to maintain the generator field switch 19 (FIG. 1) in its closed state while the relay 54 is operatively energized, even though the exciter field bias detection relay 60 is now deenergized. So long as motor speed remains higher than the predetermined threshold that keeps the relay 54 energized, the average magnitude of current in the exciter field 3b is determined by the duty cycle of the control pulses that are supplied to the field switch 44 by the pulse width modulator 47.

In the assumed motoring mode of operation, the retard signal on line 35a is "off" (low), and the duty cycle of the PWM output pulses on line 47a will be determined by the difference between the motoring current reference signal on line 31a and the motor field current signal on line 25a. Whenever a high PWM output signal or pulse is present on the line 47a, the base-to-emitter junction of the input transistor Q3 of the field switch 44 is forward biased and this transistor is "on" (i.e., conducting), thereby causing the transistor Q2 to turn on. The resulting voltage drop across the diodes D2 and D3 will reverse bias the base-to-emitter junction of the transistor Q1 which is now turned off. With Q3 and Q2 turned on, the output terminal 44a of the field switch is at substantially the same potential as the relatively negative voltage supply terminal G, and the resulting voltage difference between terminals 40 and 44a forces "positive" current of relatively high magnitude through the exciter field 3b.

During spaces between consecutive pulses from the pulse width modulator 47, the signal on line 47a is zero or slightly negative and the input transistor Q3 is consequently turned off. When Q3 is off its collector potential rises to B+, and the transistor Q2 is switched to a nonconducting state. If there were no current in the exciter field 3b, Q1 would now be forward biased and would turn on, but in fact there was current in the field winding 3b before the PWM output pulse went low, and the high inductance of this winding prevents that current from instantly decaying to zero. The rapid decrease of field current causes the field 3b to generate a voltage that raises the potential at the output terminal 44a (and consequently at the emitter of transistor Q1) to a level substantially the same as but slightly positive with respect to the potential of the relatively positive voltage supply terminal B+, thereby forward biasing the diode D4 which now conducts the positive field current to B+. During this free wheeling action, the transistor Q1 is back biased by the voltage drop across the diode D4. It will therefore be apparent that in normal pulse operation the transistor Q1 never conducts. This transistor conducts only when the duty cycle of the PWM output pulses approaches or equals 0, in which case the excitation current in the field 3b will be in the negative direction and will have a low instantaneous magnitude. In summary, the field switch output terminal 44a to which the left-hand end of the exciter field winding 3b is connected is, in normal motoring operation of the propulsion system with periodic control signals on the line 47a, alternately connected to G in the conducting state of the transistor Q2 and to B+ in the non-conducting state of Q2 (in which state the diode D4 is conducting). The average excitation current will be in the positive direction and will have a magnitude proportional to the duty cycle of the PWM output pulses on line 47a.

When the operator advances the throttle 14 to accelerate the traction vehicle from rest, the initial difference between actual and desired magnitudes of motor field current will be relatively large, and this calls for a high duty cycle (e.g., 1.0) of the PWM output pulses. In normal operation, a unity duty cycle causes the transistor Q2 in the field switch 44 to turn on and remain on continuously. There is nevertheless a possibility that Q2 will not turn on due to a malfunction in the PWM circuit 47 or in the field switch 44 itself. Such a failure mode could be potentially dangerous if the exciter field winding 3b happens to have sufficient residual magnetism in a direction to cause the rotating exciter 3 to generate wrongly polled output voltage that results in the traction motor 2 developing torque in a direction opposite to what the operator expected. This problem is avoided by the present invention wherein the above-described acceleration relay contact 50b is used temporarily to disconnect the terminal 68 from the field switch output terminal 44a and to connect it through a low impedance biasing circuit to the voltage supply terminal G, thereby ensuring that the exciter field 3b is excited by positive current (for the assumed forward direction) regardless of the off or on state of the transistor Q2. This assures that the motor always accelerates in the expected direction. As soon as the predetermined motor speed is attained and the speed threshold detector 55 energizes the relay 54, the contacts 54b and 54c are actuated so as to interrupt the low impedance field biasing circuit and to reconnect the exciter field 3b through the field switch 44. Thereafter the average magnitude of excitation current in the field 3b is controlled by operation of the field switch 44. If the transistor Q2 now fails to turn on, the excitation current will decay, the exciter output voltage will decrease, and consequently the motor 2 will slow down until the speed threshold detector 55 responds by deenergizing the relay 54 which then recycles the field biasing circuit.

Figure 3:
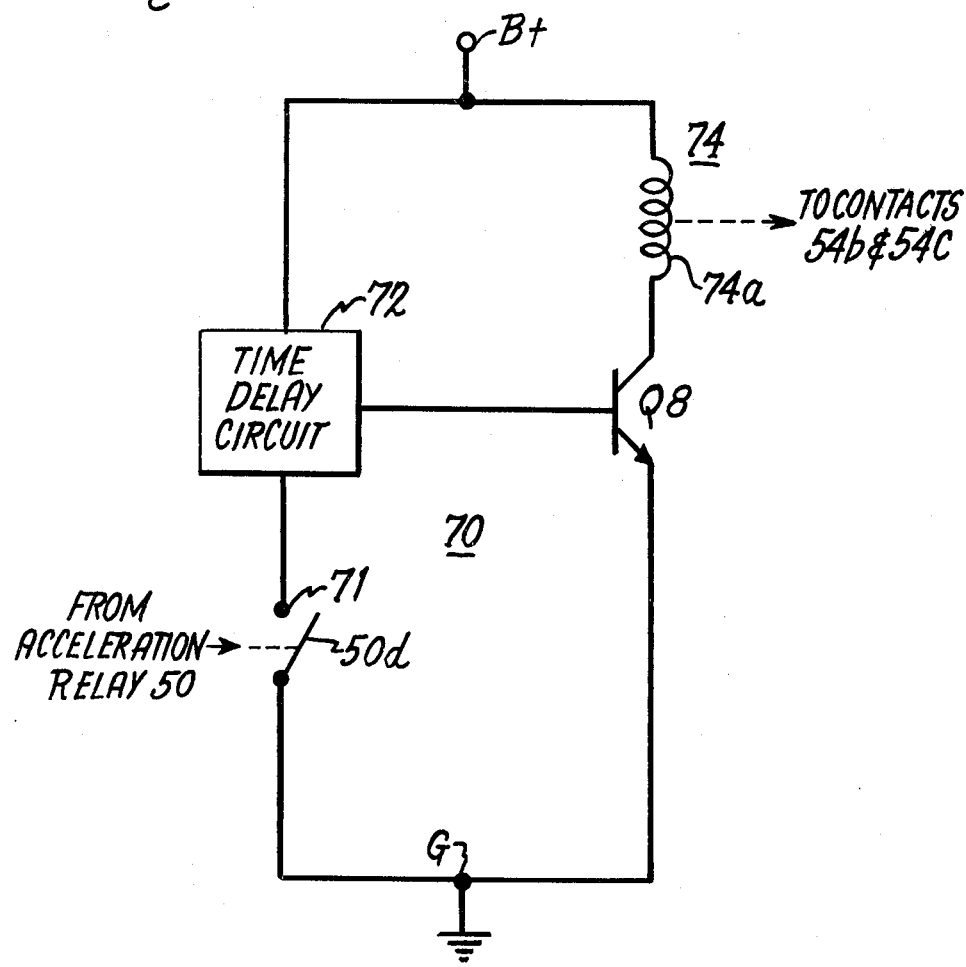
FIG. 3 is a circuit diagram partially in block form of time delay means useful in implementing a second embodiment of the invention.

Instead of actuating the contacts 54b and 54c in response to motor speed, these contacts can be actuated by time delay means 70 which is shown in FIG. 3 as an alternative embodiment of the invention. The time delay means 70 includes a time delay circuit 72 having a first input connected to the voltage supply terminal B+, a second input connected to a terminal 71, and an output connected to the base of a transistor Q8. The collector of the transistor Q8 is connected through an operating coil 74a of a relay 74 to B+, and in this embodiment the coil 74a is intended to replace the operating coil 54a of the previously described speed threshold relay 54. In FIG. 3, an additional movable contact 50d of the acceleration relay 50 completes a circuit from the terminal 71 to the voltage supply terminal G. In operation, when an acceleration command signal is produced to energize the acceleration relay 50, the contact 50d is moved into engagement with the terminal 71, thereby energizing the time delay circuit 72. After a predetermined time delay, the circuit 72 applies a high signal to the base of the transistor Q8, thereby turning on Q8 and energizing the relay 74. This moves the contacts 54b and 54c into engagement with terminals 57 and 58, respectively (see FIG. 2).

While the present invention has been described with respect to specific embodiments, modifications to the invention will occur to those skilled in the art. For example, the electromechanical relays illustrated herein could be replaced with equivalent solid-state relays, such as transistor switches, controlled by digital logic means, such as microprocessors. Accordingly, the appended claims are intended to cover all such modifications as fall within the spirit and scope of the invention.

I claim:

1. In a propulsion system for a traction vehicle including a separately excited d-c motor having an armature and a field winding, means for supplying d-c electric power to the armature of said motor, and an excitation generator having both an armature connected across said motor field winding and an excitation generator field winding, an improved control circuit for the excitation generator field winding comprising:

(a) first and second voltage supply terminals adapted to be connected to a d-c electric power source so that the potential on said first terminal differs from that on said second terminal;

(b) first means for connecting one end of said excitation generator field winding to said first terminal;

(c) second means including controllable switching means for connecting the other end of said excitation generator field winding to said second terminal, said switching means in normal operation being periodically switchable between conducting and non-conducting states;

(d) means for producing an acceleration command signal when movement of the vehicle from rest is desired; and (e) acceleration relay means responsive to said acceleration command signal for temporarily disconnecting said other end of said excitation generator field winding from said switching means and for connecting it through a relatively low impedance path to said second terminal, thereby to bias the magnetic field of the excitation generator field winding in a predetermined direction regardless of the state of said switching means.

2. The improved control circuit of claim 1 wherein means is provided for controlling aid switching means so that said conducting and non-conducting states of said switching means alternate in a pulse width modulation mode at a duty cycle which is varied to maintain a desired level of motor field winding excitation.

3. The improved control circuit defined in claim 1, further comprising time delay means operative in delayed response to the production of said acceleration command signal for open circuiting said relatively low impedance path between said other end of said excitation generator field winding and said second terminal and for reconnecting said other end to said switching means.

4. The improved control circuit defined in claim 1, further comprising speed threshold relay means operative in response to said motor attaining a predetermined speed for open circuiting said relatively low impedance path between said other end of said excitation generator field winding and said second terminal and for reconnecting said other end to said switching means.

5. The improved control circuit defined in claim 4, further comprising means for disabling said means for applying d-c electric power to said motor armature except when there is current in said relatively low impedance path or when said speed threshold relay means is operative.

6. The improved control circuit defined in claim 1, wherein said first means comprises first and second resistors and means for serially connecting said resistors between said first and second terminals, said one end of said excitation generator field winding being connected to a terminal between said resistors, and wherein said acceleration relay means includes means responsive to said acceleration command signal for temporarily connecting said one end of said excitation generator field winding through another relatively low impedance path to said first terminal.

7. The improved control circuit defined in claim 6, further comprising means operative in response to said motor attaining a predetermined speed for open circuiting the relatively low impedance path between said other end of said excitation generator field winding and said second terminal, for reconnecting said other end to said switching means, and for open circuiting said other relatively low impedance path between said one end of said excitation generator field winding and said first terminal.

8. The improved control circuit defined in claim 6, further comprising means for disabling said means for supplying d-c electric power to said motor armature except when there is current in the relatively low impedance path between said other end of said excitation generator field winding and said second terminal or when said other end is reconnected to said switching means.

* * * * *